United States Patent
Rutledge et al.

(10) Patent No.: US 7,536,746 B2
(45) Date of Patent: May 26, 2009

(54) DOOR STOP PIN ASSEMBLY

(75) Inventors: Thomas P. Rutledge, East Granby, CT (US); Robert Atkinson, Seattle, WA (US)

(73) Assignee: Kamatics Corporation, Bloomfield, CT (US)

(*) Notice: Subject to any disclaimer, the term of this patent is extended or adjusted under 35 U.S.C. 154(b) by 487 days.

(21) Appl. No.: 11/396,983

(22) Filed: Apr. 3, 2006

(65) Prior Publication Data
US 2007/0234511 A1 Oct. 11, 2007

(51) Int. Cl.
E05F 5/02 (2006.01)
(52) U.S. Cl. ........................................................ 16/82
(58) Field of Classification Search .......... 16/82, 16/85, 86 R, 86 A; 292/275, 100, 202, 262, 292/DIG. 15, DIG. 56, DIG. 73
See application file for complete search history.

(56) References Cited

U.S. PATENT DOCUMENTS

| | | | | |
|---|---|---|---|---|
| 1,394,889 A | * | 10/1921 | Foedisch et al. | 16/86 A |
| 1,871,566 A | * | 8/1932 | Stephens | 16/84 |
| 2,073,149 A | * | 3/1937 | Geyer | 292/337 |
| 2,140,002 A | * | 12/1938 | Dion | 292/70 |
| 2,496,691 A | | 2/1950 | Berry | |
| 2,885,719 A | * | 5/1959 | Nordmark et al. | 16/42 R |
| 3,187,372 A | | 6/1965 | Parsons | |
| 3,683,450 A | * | 8/1972 | Morrison et al. | 16/49 |
| 3,734,553 A | * | 5/1973 | Sugasawara | 292/251.5 |
| 3,780,345 A | * | 12/1973 | Earman, Jr. | 361/220 |
| 5,173,837 A | * | 12/1992 | Blackwell et al. | 361/681 |
| 5,241,725 A | | 9/1993 | Hamatani et al. | 16/82 |
| 5,575,514 A | * | 11/1996 | Troy | 292/340 |

FOREIGN PATENT DOCUMENTS

FR 2626822 A1 8/1989
GB 2042060 A 9/1980

OTHER PUBLICATIONS

PCT Search Report, International Application No. PCT/US2007/007168; Mailed Oct. 1, 2007.

* cited by examiner

*Primary Examiner*—Chuck Y. Mah
(74) *Attorney, Agent, or Firm*—Cantor Colburn LLP

(57) ABSTRACT

Disclosed herein is a door stop pin assembly including a pin and a base pad. The pin has a concave spherical recess. And, the base pad has an open end and a closed end such that the open end has a convex spherical portion in contact with the concave spherical recess.

17 Claims, 1 Drawing Sheet

DOOR STOP PIN ASSEMBLY

TECHNICAL FIELD

This application relates generally to a door stop, and more specifically, to an aircraft door stop pin assembly which provides a positive stop between a door and a surrounding structure, while allowing for misalignment between the two.

BACKGROUND OF THE INVENTION

Door stop pin assemblies are generally used in aircraft to ensure that contact and transmission of loads between a door assembly and a doorframe support structure is absorbed by lubricated hard points, negating any fretting or galling, which might occur due to relative motion. Relative motion between the two structures may occur due to cyclic pressurization of the fuselage and/or flight loads imposed on the external surfaces of the aircraft. Door stop pin assemblies may be found in applications such as aircraft passenger doors, cargo doors, and emergency exit doors, where alignment and the relative motion between the door and doorframe can be problematic.

Conventional door stop pin assemblies utilize a threaded stop pin having a convex spherical head on one end and a mating base pad having a concave spherical recess. The conventional configuration results in base pad heights that are not compatible with present design envelopes, and further requires the use of a wire, providing a static discharge path, between the pin and base pad, due to the use of lubrication between contact surfaces of the pin and the base pad.

Therefore, in view of the shortcomings noted, there is a need for a pin assembly having an improved configuration between the pin and base to reduce overall length thereof and which allows for conductivity between the two.

BRIEF SUMMARY OF THE INVENTION

Disclosed herein is a door stop pin assembly including a pin and a base pad. The pin has a concave spherical recess. And, the base pad has an open end and a closed end such that the open end has a convex spherical portion in contact with the concave spherical recess.

Further disclosed herein is a door stop pin assembly including a threaded pin and a base pad. The threaded pin has a concave end. And, the base pad has a complementary convex surface such that the pin and the base pad are in conductive communication with each other.

BRIEF DESCRIPTION OF THE DRAWINGS

Referring to the drawings wherein like elements are numbered alike in the several Figures.

DETAILED DESCRIPTION OF THE INVENTION

Figure 1:
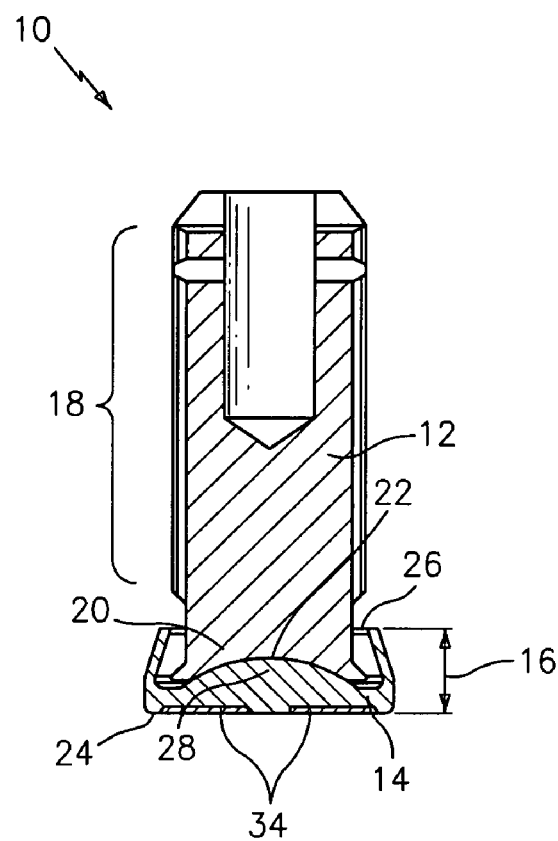
FIG. 1 is schematic cross section view of a door stop pin assembly for use in accordance with an embodiment of the invention.

Referring to FIG. 1, an exemplary embodiment of a door stop pin assembly 10 that, for example, in one embodiment can be used in aircraft door applications, is illustrated. The door stop pin assembly 10 comprises a pin 12 and a mating base pad 14. The base pad 14 is able to misalign in all directions relative to the pin 12 while providing a positive stop between a door assembly (not shown) and a doorframe support structure (not shown). The misalignment capability of the base pad 14 reduces the onset of galling and also minimizes contact stresses between the door stop pin assembly 10 and the doorframe support structure. The disclosed pin 12 and base pad 14 configuration provides many significant advantages over conventional configurations including a reduced base pad height 16, which allows the use of the door stop pin assembly 10 in smaller design envelopes, and a conductive path between the pin 12 and the base pad 14, which eliminates the need for separate wires to be connected between the two.

The pin 12 has a threaded end 18, for engagement with the door assembly, and a concave end 20, opposite the threaded end 18, which mates with the base pad 14. The concave end 20 further includes a concave spherical recess 22, which accepts a complementary mating shape of the base pad 14.

The base pad 14 has a closed end 24, which in one embodiment may be a flat planar surface, providing a contact surface with the doorframe support structure, and an open end 26, within which is included a complementary convex spherical portion 28 which mates with the concave spherical recess of the pin 12. The base pad 14 is mechanically retained to the concave end 20 of the pin 12. In one embodiment the retention may be performed by swaging, for example, the base pad 14 to the pin 12 in a manner allowing the base pad 14 to freely rotate on the complementary spherical surfaces between the pin 12 and the base pad 14.

The disclosed configuration of the pin 12, having a concave end 20, and the base pad 14, having a convex portion 28, provides a reduced base height 16 over conventional configurations by containing the mating surfaces between the pin 12 and the base pad 14 within the recess on the concave end 20 of the pin 12. Conventional configurations, which have a convex pin and a concave base pad, require the base pad to have a height capable of containing the concave portion. In other words, the base pad height in the conventional configuration is required to be greater than the depth of the concave portion of the base pad. Whereas in the disclosed configuration, the concave spherical recess 22 is contained within the pin 12, and the base pad 14 height may be sized pursuant to specific applications. In the disclosed configuration, the height 16 of the base pad 14 is not dependent on either the concave or convex spherical portions, as the convex spherical portion 28 is located on the base pad 14, and the outer edges of the convex spherical portion 28 are within the open end 26 of the base pad 14, therefore maintaining the contact surfaces within the concave end 20 of the pin 12. This disclosed configuration thus allows the base pad height 16 to be reduced significantly. Prototypes of the disclosed door stop pin assembly 10 have been successfully fabricated and exhibit a significant reduction in the base pad height 16 of about 30%, when compared to conventional base pad configurations having the same size pin. A reduced base height 16 provides for the use of the door stop pin assembly 10 in applications where tight clearance conditions have previously not allowed. The ability to reduce the base pad 14 height therefore results in smaller, lighter door assemblies, which is particularly advantageous for aerospace applications where weight restrictions and/or size and space constraints are a significant consideration.

Figure 2:
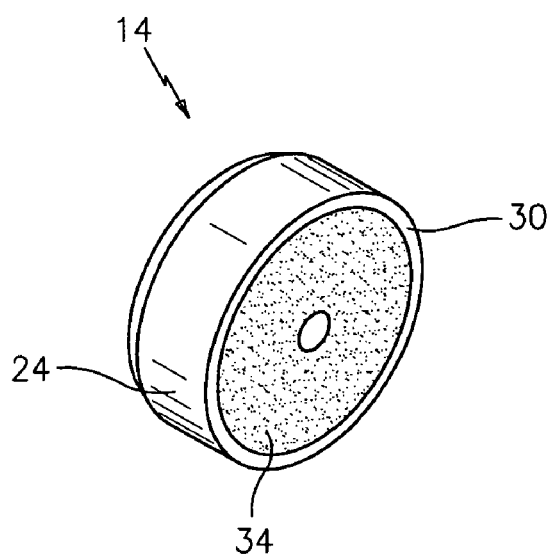
FIG. 2 is a perspective view of a base pad for use in accordance with an embodiment of the invention.
Figure 3:
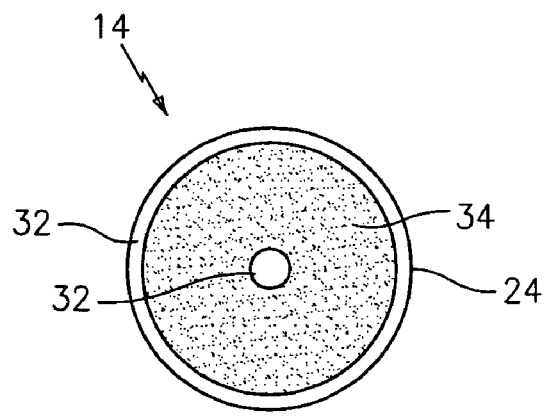
FIG. 3 a bottom plan view of the base pad for use in accordance with an embodiment of the invention.

The base pad 14 may, in one embodiment, be fabricated from a non-galling material such as, but not limited to, Toughmet® (CuNiSn), aluminum nickel bronze, nitronic 60, copper beryllium, 660 bronze, aluminum bronze, high-lead tin bronze, copper casting alloys, plastics, composites, etc. The non-galling material allows the pin 12 and base pad 14 to be assembled without the use of lubrication, or with just a one-time light application of grease, between the concave and convex mating spherical surfaces. The use of the non-galling material may further provide a conductive path between the base pad 14 and the pin 12, as lubrication is not required between the two. Conventional door stop pin assemblies require a jumper wire to be attached (soldered, welded, or held in place by a spring force) to both the base pad and the pin. The base pad 14, in one embodiment, may also include a conductive path between the non-galling base pad 14 and the doorframe support structure by use of, but not limited to, a "ring" 30 (having exposed material along the outer periphery of the closed end 24 as in a ring shape) or "bull's-eye" 32 (having exposed material in a ring shape along the outer periphery of the closed end 24, with the addition of a center portion of exposed material at the ring center point) configuration on the closed end 24 of the base pad 14 (illustrated in FIGS. 2 and 3). Thus, the disclosed door stop pin assembly 10 provides a conductive path through the entire assembly for static discharge and/or lightning strikes without additional jumper wires, grounding straps, and/or any additional electrically conductive devices.

The closed end of the base pad 14, which contacts the doorframe support structure, may, in one embodiment, further utilize a suitable low-friction and/or wear resistant material containing a solid lubricant 34. The solid lubricant wear resistant material is a coating which provides wear resistance and low friction and is typically referred to in the industry as a wear resistant material, self-lubricating material, solid lubricant material, anti-fretting material, anti-galling material, solid film lubricant, or dry film lubricant. The lubricant material may also be in a thermosetting or thermoplastic resin system which acts as a self lubricating liner system. Representative solid lubricants 34 include, but are not limited to, polytetrafluoroethylene, polyetheretherketone, polyamide-imide, graphite, molybdenum disulfide, tungsten disulfide, boron nitride, mixtures of these constituent materials, and composite materials which contain these materials imbedded in a host matrix polymeric, metallic, or ceramic material. The wear resistant material provides anti-fretting and anti-galling protection for both the base pad 14 and the doorframe support structure. Furthermore, the low-friction characteristics of the solid lubricant 34 material greatly reduce the bending and fatigue loads imposed on door stop pin assembly 10 by allowing relative motion between and the doorframe support structure and the door stop pin assembly 10. The reduced bending and fatigue stresses provide an advantage in that it allows for the reduced size of the pin assembly in applications where space and weight restrictions are a concern.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A door stop pin assembly comprising:
 a pin having a concave spherical recess; and
 a base pad having an open end and a closed end wherein the open end has a convex spherical portion in contact with the concave spherical recess, the convex spherical portion being fully contained and disposed in a recess within the open end of the base pad.

2. The door stop pin assembly of claim 1 wherein the contact surfaces of the concave spherical recess and the convex spherical portion are contacted without lubrication, or with a one-time light application of grease, therebetween.

3. The door stop pin assembly of claim 1 further comprising an electrically conductive path between the pin and the base pad.

4. The door stop pin assembly of claim 1 wherein the closed end of the base pad further comprises a solid lubricant, or a lubricant material in a thermosetting or thermoplastic resin system which acts as a self lubricating liner system.

5. The door stop pin assembly of claim 1 wherein the base pad further comprises an electrically conductive path between the closed end and a mating structure abutting the closed end.

6. The door stop pin assembly of claim 5 wherein base pad further comprises a ring of electrically conductive material disposed at the closed end.

7. The door stop pin assembly of claim 5 wherein the base pad further comprises a bull's-eye configuration of electrically conductive material disposed at the closed end.

8. The door stop pin assembly of claim 1 wherein the pin further comprises a threaded end.

9. The door stop pin assembly of claim 1 wherein the base pad is fabricated from a non-galling material.

10. The door stop pin assembly of claim 1 wherein the base pad is rotatable about the spherical surfaces to allow for misalignment capability between the pin and the base pad.

11. A door stop pin assembly comprising:
 a threaded pin having a concave end; and,
 a base pad having a complementary convex surface wherein the pin and the base pad are in electrically conductive communication with each other, the convex surface being fully contained and disposed in a recess within an open end of the base pad.

12. The door stop pin assembly of claim 11 wherein the electrically conductive communication between the pin and the base pad does not require a jumper wire to be connected between the pin and the base pad.

13. The door stop pin assembly of claim 11 wherein the concave end further comprises a concave spherical recess.

14. The door stop pin assembly of claim 13 wherein the convex surface is a convex spherical surface.

15. The door stop pin assembly of claim 14 wherein the base pad is rotatable about the spherical surfaces between the pin and the base pad.

16. The door stop pin assembly of claim 11 wherein the base pad is fabricated from a non-galling material.

17. The door stop pin assembly of claim 11 wherein the base pad further comprises an electrically conductive path between the base pad and a mating structure.

\* \* \* \* \*